United States Patent [19]
Orenstein
[11] Patent Number: 4,571,948
[45] Date of Patent: Feb. 25, 1986

[54] FLUID DIFFUSER AND METHOD FOR CONSTRUCTING THE SAME

[76] Inventor: Ira Orenstein, Reh. Moleho 3/8, Ramat Gan, Israel

[21] Appl. No.: 674,730

[22] Filed: Nov. 27, 1984

Related U.S. Application Data

[63] Continuation of Ser. No. 445,192, Nov. 29, 1982, abandoned.

[51] Int. Cl.[4] .......... F17D 1/20; F03G 7/02

[52] U.S. Cl. .......... 60/641.8; 137/590; 137/592

[58] Field of Search .......... 137/590, 592; 60/641.8

[56] References Cited

U.S. PATENT DOCUMENTS

| | | | |
|---|---|---|---|
| 1,783,249 | 12/1930 | MacMillen | 137/592 |
| 1,873,037 | 8/1932 | Riggenberg | 137/592 |
| 2,632,466 | 3/1953 | Ayers | 137/590 |
| 2,638,222 | 5/1953 | Roach | 137/590 |
| 2,732,071 | 1/1956 | Crow | 137/590 |
| 3,782,416 | 1/1974 | Levin | 137/590 |
| 4,336,999 | 6/1982 | Assaf | 60/641.8 |
| 4,370,860 | 2/1983 | Assaf | 60/641.8 |
| 4,377,071 | 3/1983 | Assaf et al. | 60/641.8 |
| 4,446,700 | 5/1984 | Bronicki et al. | 60/641.8 |

*Primary Examiner*—Alan Cohan
*Assistant Examiner*—John A. Rivell
*Attorney, Agent, or Firm*—Sandler & Greenblum

[57] ABSTRACT

Fluid diffuser and method for constructing the same are disclosed. The fluid diffuser including a pair of disks having opposite, facing surfaces of revolution with a common axis of symmetry for defining a fluid flow path. The cross-section of the fluid flow path normal to the direction of flow is constructed and arranged so that the cross-section varies continuously with the radial distance from the common axis of symmetry so as to provide uniform fluid flow velocities in plane and in section at the periphery of the diffuser. The method for manufacturing the fluid diffuser includes rigidly fastening together a plurality of elements shaped to conform to the shape of the inner surface of the diffuser so as to form a skeletal frame. Thereafter, a unitary sheet of resilient material is stretched on the frame to cover the same thus causing the material to define the desired surface, the stretch material being fastened by suitable means to the frame.

16 Claims, 10 Drawing Figures

FLUID DIFFUSER AND METHOD FOR CONSTRUCTING THE SAME

This application is a continuation of application Ser. No. 445,192, filed Nov. 29, 1982 now abandoned.

BACKGROUND OF THE INVENTION

1. Field of the Invention

This invention generally relates to a fluid diffuser and method for constructing the same, and more particularly, to a fluid diffuser for use with a salt water solar pond.

2. Discussion of the Prior Art

Artificial salt water solar ponds are presently used as solar collectors in order to provide a source of low-grade heat for conversion into electricity. Such ponds have a three layer regime: an upper convective wind-mixed layer at the surface with an average salinity of 3-5 percent, and a depth of approximately 30-50 centimeters, depending upon wind conditions; an intermediate, non-convective layer termed a halocline, about 1-1.5 meters deep, with a salinity that increases uniformly with depth from about 5 percent at the top of the layer to about 30 percent at the bottom of the layer; and a lower heat-storage layer, approximately 3-5 meters deep, depending upon the amount of heat-storage desired, with a uniform salinity of about 30 percent.

Solar radiation incident on the surface is absorbed within the layers of the pond. Heat absorbed within a stratum of the wind-mixed layer reduces the density of the stratum, and creates buoyant water which quickly reaches the surface, dissipating the absorbed heat into the atmosphere. Thus, the temperature of the wind-mixed layer approximates ambient temperature. However, heat absorbed in the halocline and in the heat-storage layer is trapped in these layers because of the non-convective nature of the halocline.

As is well-known, a halocline has such a strong, downward salinity gradient that the resultant density profile also increases with depth even as the temperature also increases with depth. As a consequence, the halocline is a non-convective layer wherein heat conductivity is reduced to the molecular level. The halocline, thus, insulates the underlying heat-storage layer; and the absorption of solar radiation establishes a temperature profile in the pond which matches the salinity profile. The halocline thus serves as a transparent, insulating cover for the heat-storage layer, and protects the latter against convective heat loss to the atmosphere. From actual experience with solar ponds, the halocline is remarkably stable for long periods of time, because the rate of salt diffusion is so low.

However, the halocline is particularly sensitive to the effects of uncontrolled mixing which disrupts the downward salinity gradient of the halocline. This uncontrolled mixing destroys the ability of the halocline layer to function as an insulator by allowing hot water in the bottom zone to circulate to the surface, and thus the ability of the pond to function as a solar collector.

Uncontrolled mixing between the halocline and heat-storage layer can occur due to turbulence created in the heat-storage layer during the extraction and return of the hot brine which is typically utilized as a low temperature heat source for use with Rankine cycle turbines or the like.

In commercial solar ponds presently in operation, large, flat-plate diffusers are employed to extract and return the hot brine of the heat-storage layer. These known flat-plate diffusers include a pair of flat, stamped or machined circular plates which are equally spaced from one another so as to form a cylindrical peripheral opening that communicates with the heat-storage layer of the pond. One plate is provided with an aperture for connection to a fluid circuit external to the pond in order to extract hot brine to be delivered to a boiler supplying vaporized working fluid to a turbine, or to deliver cooled brine from the boiler. Typically, the extraction diffuser is positioned in the heat-storage layer just below the halocline where the temperature of the layer is a maximum. The return diffuser for exhausting the cooled brine after heat extraction, is positioned below the extraction diffuser at a depth where the temperature of the heat-storage layer approximates the temperature of the cooled brine.

In order to reduce turbulence and prevent unintentional mixing between the halocline and heat storage layer, conventional diffusers are designed to achieve very small flow velocities, e.g., approximately one centimeter per second at the periphery of the diffuser in a radial direction. The requirement for such low velocities results in diffusers of large size because of the large volume of brine which must be transferred from and to a boiler in a commercial salt water solar pond. For example, ponds are currently under construction where the mass flow from the heat storage layer through a diffuser may be as high as 150 $m^3$/hr. with an exit speed of 1 cm/sec, a diffuser 1 m high must be about 6 m in diameter.

The volumetric flow rate of known flat-plate diffusers can be increased by enlarging the overall diameter of the diffuser. However, these diffusers are bulky and prove to be an expensive solution due to the high cost of producing large diameter plates which are formed by a stamping or machining operation. It is, therefore, an object of the present invention to provide a new and improved fluid diffuser that reduces turbulences and enables the use of increased flow velocities which permits the diffuser to be smaller, and more compact in diameter, and which, above all, can be made at a reduced cost as compared to a conventional machined or stamped diffuser.

SUMMARY OF THE INVENTION

According to the present invention, a fluid diffuser for a solar pond includes a pair of discs having opposite facing surfaces of revolution with a common axis of symmetry for defining a first fluid flow path. The cross-section of the first flow path, normal to the direction of fluid flow, is constructed and arranged to vary continuously with the radial distance from the axis of symmetry. This arrangement provides a uniform distribution of increased velocities along streamlines of the flow path.

The fluid diffuser of the present invention is adapted for use as an extraction diffuser when the first fluid path is adapted for connection to a second fluid flow path having a convergent cross-sectional configuration in the direction of flow and is adapted for use as a return diffuser when the first fluid flow path is adapted for connection to a second fluid flow path having a convergent cross-sectional configuration in the direction of flow.

The invention also includes a method of manufacturing a body having a surface of revolution defined by a generatrix of predetermined shape. The method comprises the steps of rigidly fastening together a plurality of elements shaped to conform to the shape of the generatrix for forming a skeletal frame having an axis of symmetry coincident with the axis of revolution of the surface; stretching a unitary sheet of resilient material on the frame to cover the same for causing the material to define the surface of revolution; and fastening the stretched material to the frame.

BRIEF DESCRIPTION OF THE APPLICATION DRAWINGS

An embodiment of the present invention is shown in the accompanying drawings wherein:

FIG. 1 schematically illustrates the positioning of the fluid diffuser of the present invention in a solar pond;

FIG. 2 is a sectional view of the fluid diffuser of the present invention;

FIG. 3 schematically illustrates the method of forming the fluid diffuser of the present invention;

DETAILED DESCRIPTION OF THE PREFERRED EMBODIMENT

Figure 1:
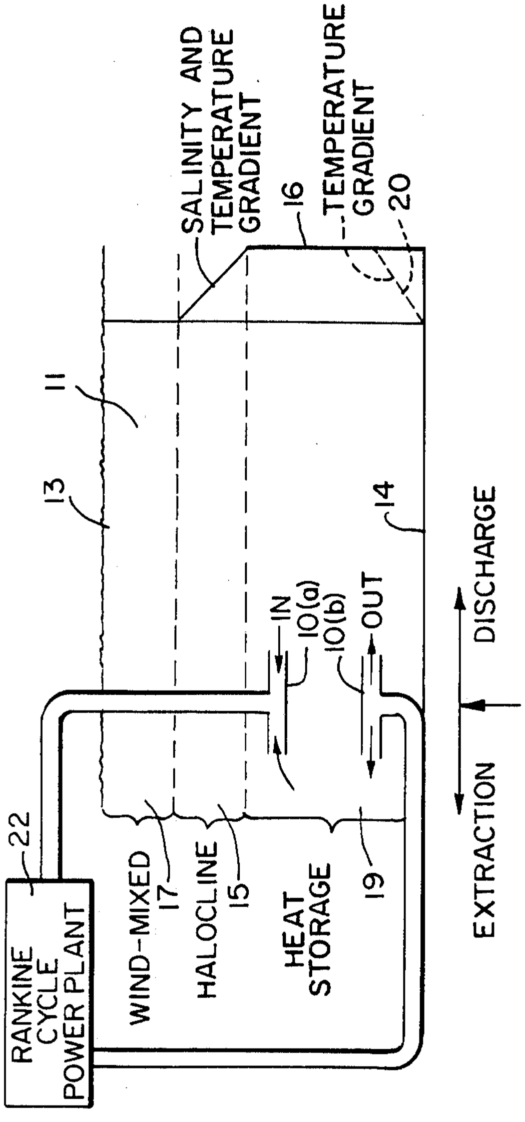

FIG. 1 illustrates a pair of fluid diffuser 10(*a*) and 10(*b*), according to the present invention, the diffusers being immersed in solar pond 11 which is a body of water having upper surface 13 exposed to solar radiation and bottom 14. Salts dissolved in pond 11 establish halocline 15 wherein the salinity greatly increases with depth at a uniform rate as indicated by the salinity profile shown by solid line 16.

Halocline layer 15 is overlaid by wind-mixed layer 17 having a depth of about 30–50 centimeters wherein the salinity is uniform due to the result of wind mixing at the surface. Beneath halocline layer 15 is heat-storage layer 19 having a constant salinity profile as indicated by salinity profile 16 shown in FIG. 1.

Solar radiation incident on surface 13 is absorbed within the various layers of solar pond 11. Heat absorbed within a stratum of wind-mixed 17 reduces the density of this stratum thereby creating buoyant water which quickly reaches the surface where the absorbed heat is dissipated into the atmosphere. Thus, the temperature of wind-mixed layer 17 approximates ambient temperature.

However, heat absorbed in halocline layer 15 and heat-storage layer 19 remains trapped in these layers due to the non-convective nature of halocline layer 15 as is well understood in the art. As a result, solar radiation establishes a temperature profile indicated by dashed line 20 that matches salinity profile 16 with the exception that temperature profile 20 decreases in heat-storage layer 19 near bottom 14 of pond 11.

Brine in heat storage layer 19 is extracted by means of extraction fluid diffuser 10(*a*) and conveyed to a heat exchanger (not shown) in power plant 22 and thereafter returned to heat-storage layer 19 by means of return fluid diffuser 10(*b*). As illustrated in FIG. 1, the extraction fluid diffuser is positioned adjacent halocline layer 15 and the return diffuser is positioned near the bottom 14 of pond 11.

Because the extraction diffuser is positioned adjacent halocline layer 15, turbulence resulting from turbulence caused by the flow of brine into the diffuser can significantly disturb the density profile of halocline layer 15. An uncontrolled mixing of the halocline may expose the heated brine to the atmosphere destroying the ability of the pond to function as a solar collector. Thus, it is important, when extracting and returning brine to heat-storage layer 19, to minimize turbulent flow.

Figure 2:
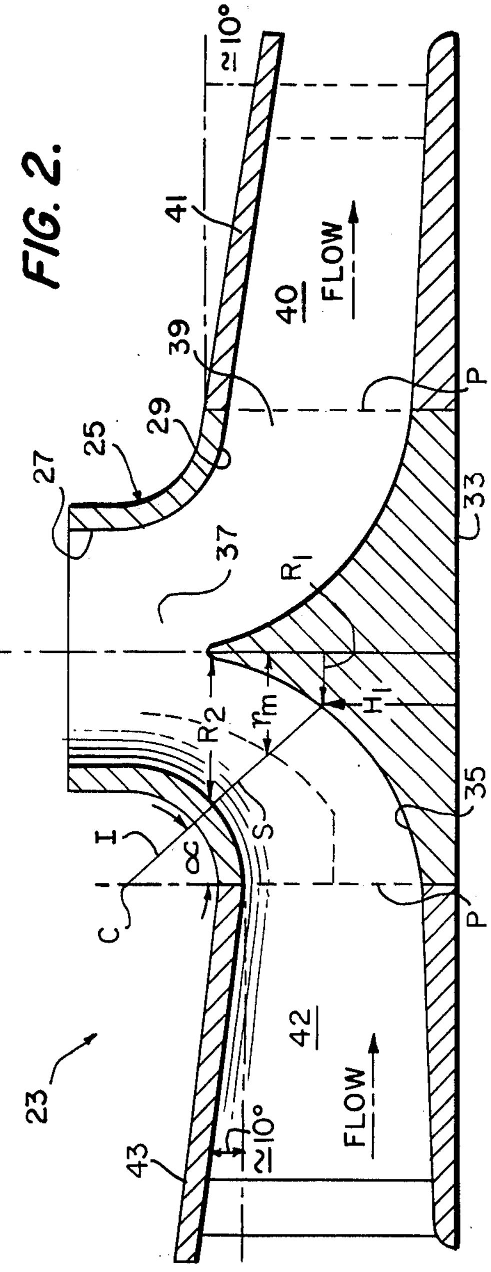

Referring to FIG. 2, the fluid diffuser of the present invention is generally indicated at 23. Diffuser 23 comprises first plate 25 having centrally-located aperture 27 and inner surface of revolution 29 symmetrically located with respect to the axis of aperture 27. Spaced from first plate 25 is second plate 33 having inner surface of revolution 35 that is concentric with aperture 27 and conical-like in form. Opposite facing surfaces 29 and 35, respectively, have a common axis of symmetry 31 so as to define a first fluid flow path 37. Cross-section S of first flow path 37, normal to the direction of fluid flow, is constructed so that cross-section S varies continuosly with the radial distance from the common axis of symmetry 31. This arrangement assures a continuous profile of fluid flow velocities to prevent turbulent flow by assuring a uniform distribution of increasing velocities along periphery P of diffuser 23.

Cross-section S of first fluid flow path 37 can be defined by imaginary line I which passes through center of curvature C of inner surface 29 of first plate 25 as follows:

$$S=\pi/\sin\alpha(R_2^2-R_1^2) \qquad (1)$$

where $\alpha$ defines the angle formed by imaginary line I and a vertical line; $R_2$ is the perpendicular distance between axis of symmetry 31 and inner surface 29 of first plate 25; and $R_1$ is the perpendicular distance between axis of symmetry 31 and inner surface of revolution 35 of second plate 33.

Taking into account that flow is constant, linear velocities profile is achieved by a linear variation of cross-section S with respect to the mean radial distance $r_m$. This can be written as a linear function of mean radius $r_m$ as follows:

$$S(r_m)=ar_m-b \qquad (2)$$

$$S(r_m)=(\pi D/3)(7r_m-D) \qquad (3)$$

where D is the diameter of aperture 27. Expressing $$R_2=D[1-(\sin\alpha)/2] \qquad (4)$$

where $$r_m=(R_1+R_2)/2 \qquad (5)$$

we obtained $$S(r_m)=(4\pi r_m/\sin\alpha)[D(1-(\sin\alpha)/2)-r_m] \quad (6)$$

Equally equations 3 and 6 we obtain $$r_m = [(\sin\alpha)/8][(4R_2/\sin\alpha) - (7D/3) + \sqrt{[(7D/3) - (4R_2/\sin\alpha)]^2 + (16D^2/(3\sin\alpha))}] \quad (7)$$

The coordinates of inner surface of revolution 35 of second plate 33 can be expressed by the following connus coordinates:

$$R_1=2r_m-R_2 \quad (8)$$

$$H_1=D/2(3-\cos\alpha)-(R_2-R_1)\cot g\alpha \quad (9)$$

where $H_1$ is the vertical distance between the bottom of second plate 33 and inner surface 35.

Preferably, the periphery of first and second plates 25 and 33, respectively, are substantially circular to form cylindrical opening 39. When the diameter of aperture 27 is D, according to a preferred embodiment of the present invention, the height of cylindrical opening 39 is also D. In this preferred embodiment, both first and second plates 25 and 33, respectively, have a diameter equal to or less than 2D. Thus, radius of curvature C of inner surface 29 of first plate 25 is substantially equal to D/2.

In order to adapt the fluid diffuser of the present invention as a discharge or return diffuser, first flow path 37 is connected to second fluid path 40 having an upper plate 41 poised at a negative slope as indicated by the right-hand portion of FIG. 2. For such a return diffuser, the negative slope of upper plate 41, preferably, is about negative 10 degrees from an imaginary horizontal line. By providing second fluid flow path 40 with a convergent cross-section in the direction of flow, the return diffuser avoids the take-off and suction at the diffuser's periphery.

To adapt the diffuser of the present invention as an extraction or suction diffuser, first flow path 37 is connected to second flow path 42 having upper plate 43 poised at a positive angle of about 10° with respect to the horizontal as indicated by the left-hand portion of FIG. 2 so as to form second flow path 42 with a convergent cross-section in the direction of flow. Thus, the diffuser of the present invention can be easily adapted as a discharge or extraction diffuser by extending plates 25 and 33 depending upon the slope of first plate 25 without providing any second flow path at all. Thus, the diffuser of the present invention has a special geometry that provides radial intakes and outlets for the heat-storage layer of solar ponds and is adapted to assure a uniform distribution of flow velocities in plane and in section along the periphery of the diffuser which has a compact diameter. The connus-like or inner surface of revolution 35 of second plate 33 is calculated in concordance with the geometry of inner surface of revolution 29 of first plate 25 as indicated above.

Figure 3:
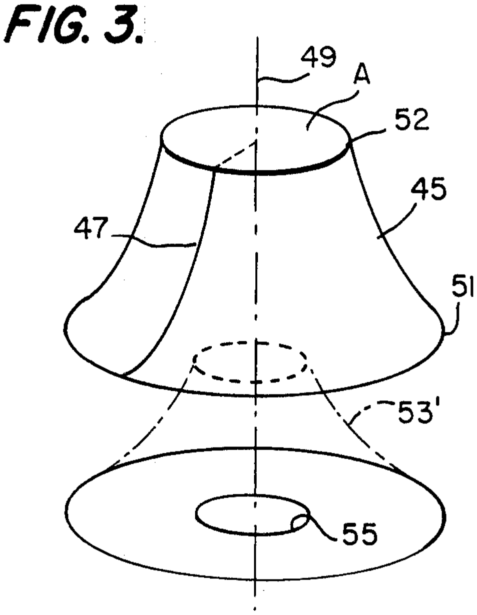

According to the present invention, there is also disclosed a method for constructing the fluid diffuser of the present invention. The method of the present invention is best understood with reference to FIG. 3 which illustrates body 45, having an inner surface corresponding to that of first plate 25. Body 45 has a surface of revolution defined by generatrix 47 which is moved through space about axis of symmetry 49. Body 45, thus formed, has an inner surface of revolution which forms a frusto-conical surface having first axial peripheral edge 51 which has a larger diameter than second axial peripheral edge 52. Positioned beneath body 45 is unitary flexible sheet 53 of any suitable fluid impervious resilient material. Preferably, unitary sheet 53 is initially round and provided with a centrally-located aperture 55. Both body 45 and unitary sheet 53 have a common axis of symmetry 49.

In order to form inner surface of first plate 25, unitary sheet 53 is attached to first axial peripheral edge 51 and by grasping region 55, is stretched over the inner surface of body 45, as indicated by dotted lines 53', so as to cover the same and define the desired geometric configuration. Thereafter, the sheet is fastened to aperture A formed at the top of body 45 thus conforming the stretched material to the desired inner surface of revolution.

Figure 4A:
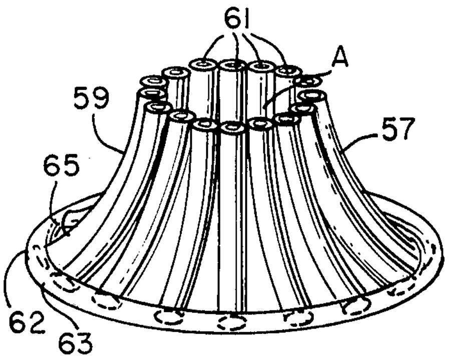
FIG. 4(A) illustrates the skeletal frame for forming the upper plate of the fluid diffuser of the present invention.
Figure 4B:
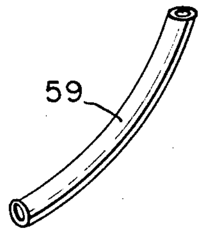
FIG. 4(B) is a side view of the shaped elements forming the skeletal frame of the present invention.

Body 45 can be formed in any suitable manner; however, according to a preferred embodiment of the present invention, body 45 is formed from skeletal frame 57 as illustrated in FIG. 4(A). Skeletal frame 57 is formed by rigidly fastening together a plurality of elements 59, one element 59 being illustrated by FIG. 4(B). Each element 59 has a shape which conforms with the shape of generatrix 47 and each element 59, preferably, is formed from a piece of curved tube or pipe. However, any other suitable element may be employed as is well-understood by one of ordinary skill in the art.

Skeletal frame 57 is formed by rigidly fastening elements 59 by any suitable means, for example, by welding, as at 61. Preferably, the top portion of frame 57, which forms aperture 27 of first plate 25, is provided with a bead 66 best illustrated by FIGS. 5 and 9. Axial peripheral edge 62 of skeletal frame 57 is, preferably, formed by welding circular pipe 63 as at 65 to elements 59 of frame 57.

Figure 5:
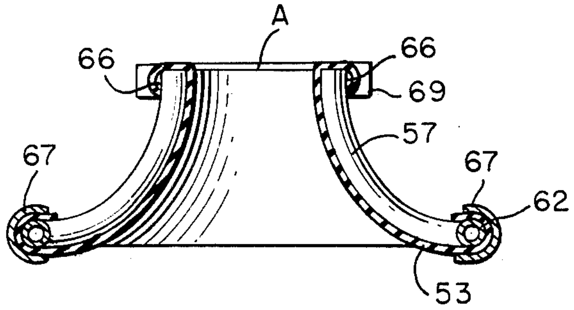
FIG. 5 is a side, sectional view, illustrating the positioning of resilient material on the frame of the present invention.
Figure 6:
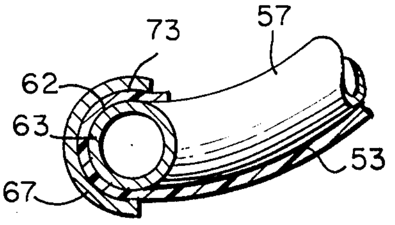
FIG. 6 is a sectional view of the clamping arrangement for securing the resilient material to the frame of the present invention.

Referring to FIG. 5, liner 53, which is stretched onto the inner surface formed by frame 57, is first fastened to larger peripheral edge 62 of frame 57 by any suitable means 67 such as by a ring clamp as shown in FIG. 6. Liner 53 is then pulled through aperture A utilizing any suitable means, such as a suction device, and thereafter liner 53 is cut to form a centrally-located aperture. Alternatively, an aperture can be first provided in centrally-located region 55 and thereafter, liner 53 pulled through aperture A. The liner 53 is then attached to bead 66 of aperture A by suitable clamping means 69 as seen in FIG. 5.

Figure 7:
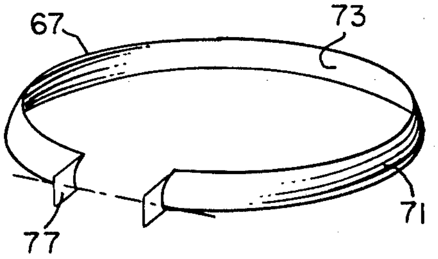
FIG. 7 is a perspective view of the clamp adapted to secure the resilient material to the frame of the present invention.

Preferably, clamp 67 comprises a ring clamp having circular ring 71, as illustrated in FIGS. 6 and 7, having inner surface 73 adapted to conform to the configuration of axial peripheral edge 62 of frame 57. Suitable turnbuckle and screw means 77 is provided to reduce the diameter of circular ring 71 so as to clamp resilient material 53 between circular pipe 63 and inner surface 73 as illustrated by FIG. 6.

Figure 8:
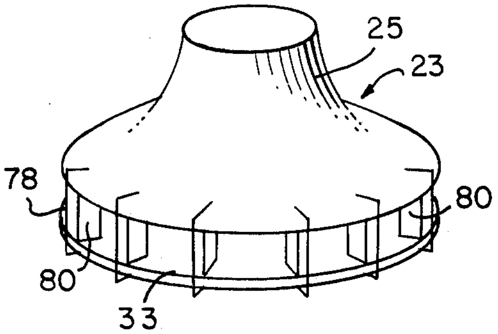
FIG. 8 is a perspective view illustrating the assembled diffuser of the present invention.

Referring to FIG. 8, once first plate 25 of diffuser 23 has been formed as described hereinabove, second plate 33 is attached to and spaced from first plate 25 by means of a plurality of C-clamps 78 and spacers 80 as shown by FIG. 8. Clamps 78, in cooperation with spacers 80, attach and locate second plate 33 with respect to first plate 25 so as to form the desired fluid flow path of the present invention.

Figure 9:
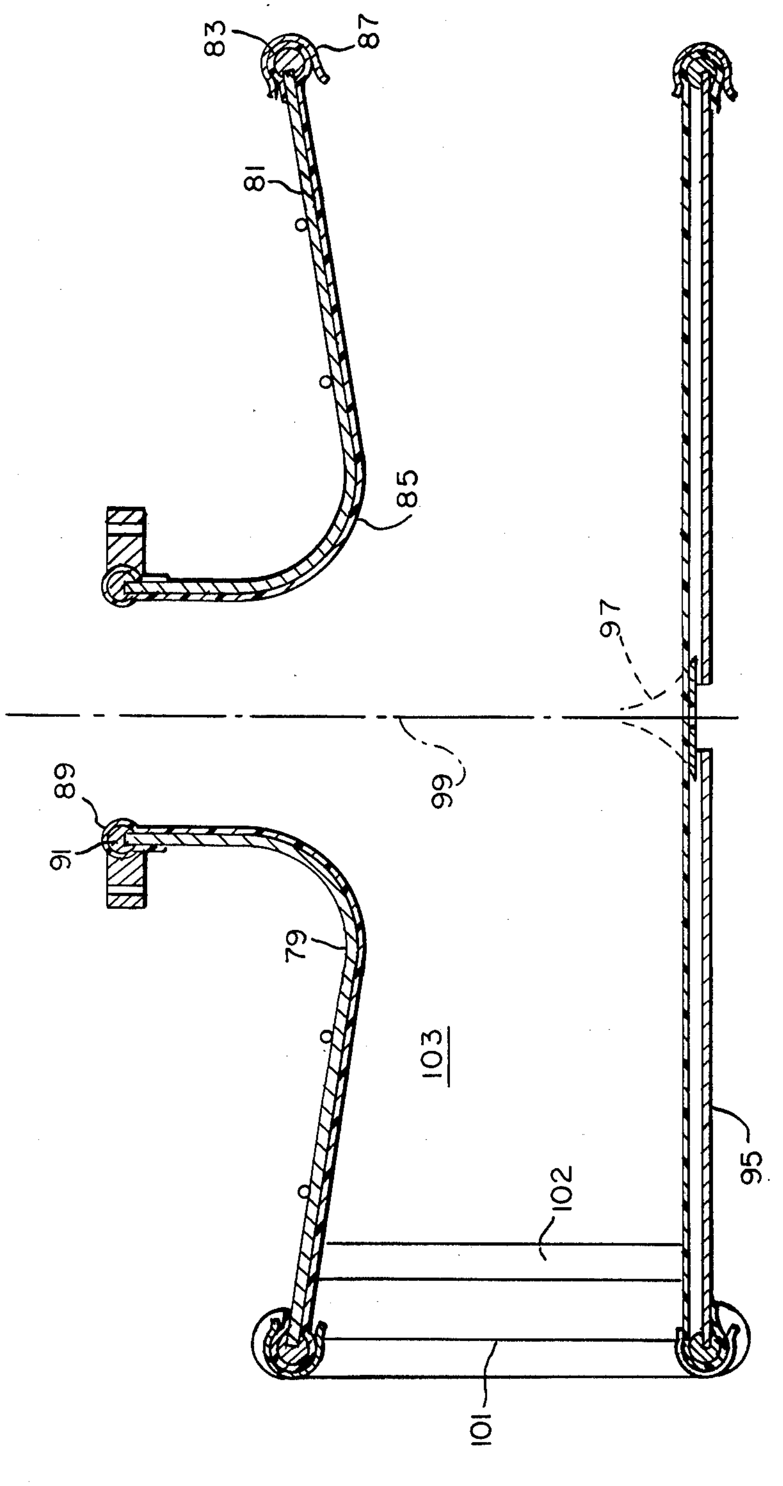
FIG. 9 is a side view, in section, of the assembled diffuser of the present invention.

Referring to FIG. 9, a suction or extraction diffuser 79 is illustrated, in section, which has been manufactured according to the method of the present invention.

As described above, first plate 81 comprises a skeletal frame formed from a plurality of rigid elements. Clamped to axial peripheral edge 83 of first plate 81 is the outer edge of resilient liner 85, such clamping being provided by means of clamp 87. Central region 89 of liner 85 is clamped to bead 91 of the skeletal frames by means of a suitable clamp 93.

Spaced from first plate 81 is second plate 95 including centrally-located connus 97 having axis of symmetry 99 which is common to both first and second plates 81 and 95, respectively. Second plate 95 can be formed from a suitable flat plate or skeletal frame having a resilient liner as described with respect to the first plate of the fluid diffuser of the present invention. Connus 97 can be formed by any suitable manner, including by means of the skeletal frame described with regard to the first plate of the fluid diffuser or, alternatively, connus 97 can be formed by milling or casting as is well understood by one of ordinary skill in the art. Clamps 101 and spacers 102 connect and locate first and second plates 91 and 95, respectively, so as to form the desired fluid flow path 103 which assures a uniform distribution of increasing fluid flow velocities in plane and in section along the periphery of the diffuser. Preferably, the clamps 101 are positioned every 120 degrees about the circumference of the circle formed by the diffuser.

From the foregoing description, one skilled in the art can easily ascertain the central characteristics of this invention and without departing from the spirit and scope thereof, can make various changes and modifications of the invention to adapt it to various uses and conditions.

What is claimed is:

1. A diffuser for a fluid comprising:

(a) a first plate having a peripheral edge and a centrally located aperture of diameter D and having an axis of rotation, said first plate having an inner surface of revolution symmetrical with respect to said axis of rotation;

(b) a second plate spaced from said first plate and having a peripheral edge and an inner surface of revolution that is concentric with the axis of rotation of said aperture;

(c) first and second fluid flow paths defined by said inner surface of said first plate and said inner surface of revolution of said second plate, said first and second fluid flow paths being oriented such that fluid traversing the flow paths is turned through 90°, said first flow path being connected to said second flow path which terminates at the respective peripheral edges of the first and second plates; and (d) said inner surface of said first plate and said inner surface of revolution of said second plate being constructed and arranged such that the cross-section of each of said first and second fluid flow paths, throughout their respective lengths, varies continuously with radial distance from said axis whereby the velocity profile of fluid flowing through said paths is continuous to prevent turbulent flow.

2. A diffuser according to claim 1, wherein said first fluid flow path has a cross-section adapted to provide a uniform distribution of increasing fluid flow velocities in both plane and in section along the periphery of said first and second plates.

3. The diffuser according to claim 2, wherein both said first and second plates are substantially circular, the diameter of said plates being equal to or less than 2D.

4. The diffuser according to claim 2, wherein said first flow path has a radius of curvature substantially equal to D/2.

5. The diffuser according to claim 4, wherein the cross-section S of said first flow path is defined by an imaginary line which passes through the center of curvature of said inner surface of said first plate, and is defined as follows:

$$S=(\pi/\sin\alpha)/(R_2^2-R_1^2)$$

where $\alpha$ is the angle formed by the imginary line and a vertical line;

$R_2$ is the perpendicular distance between the axis of rotation of said aperture drawn through the center of said inner surface of revolution of said second plate and said inner surface of said first plate; and $R_1$ is the perpendicular distance between the axis of rotation of said aperture drawn through the center of said inner surface of revolution of said second plate and said inner surface of revolution of said second plate.

6. The diffuser according to claim 5, wherein the cross-section S of said first flow path varies as a function of $r_m$ as follows:

$$S(r_m)=(4\pi r_m/\sin\alpha)[D(1-(\sin\alpha)/2)-r_m]$$

where $$r_m=[(\sin\alpha)/8][(4R_2/\sin\alpha)-(7D/3)+\sqrt{[(7D/3)-(4R_2/\sin\alpha)]^2+(16D^2/(3\sin\alpha))}]$$

7. The diffuser according to claim 6, wherein the coordinates of said inner surface of revolution of said second plate are:

$$R_1=2r_m-R_2 \text{ and}$$

$$H_1=[(D/2)(3-\cos\alpha)]-(R_2-R_1)\cot g\alpha$$

where $H_1$ is the vertical distance between said inner surface of revolution and the outer surface of said second plate.

8. The diffuser according to claim 7, wherein said diffuser extends beyond said cylindrical opening, and has a negative slope.

9. The diffuser according to claim 7, wherein said diffuser extends beyond said cylindrical opening, and has a positive slope.

10. A fluid diffuser comprising:

(a) a pair of circular plates having peripheral edges, one of said plates having a circular opening, said plates having opposite, facing surfaces of revolution with a common axis for defining first and second fluid flow paths, one end of the first flow path being defined by said circular opening, the other end of the first flow path being connected to one end of the second flow path whose other end is defined by the peripheral edges of said plates, said flow paths being oriented such that fluid traversing said flow paths is turned through 90°;

(b) said opposite, facing surfaces being constructed and arranged so that the cross-section of each of the first and second fluid flow paths varies, throughout its respective length, continuously with radial distance from said axis.

11. A fluid flow diffuser according to claim 10 wherein the cross-section of said first fluid flow path increases with radial distance from said axis.

12. A fluid diffuser according to claim 11 wherein the cross-section of said second flow path decreases with radial distance from said axis.

13. A fluid diffuser according to claim 11 wherein the cross-section of said second flow path increases with radial distance from said axis.

14. A diffuser according to claim 2 wherein the space between the inner surface of revolution and said first and second plates at the junction between the first and second flow paths is approximately equal to D and defines a cylindrical opening.

15. Apparatus comprising:

(a) a salt water solar pond having a halocline with a downwardly directed salinity gradient interposed between an upper wind-mixed layer of brackish water for receiving incident solar radiation and a lower heat storage layer of concentrated brine for storing heat; and (b) an extraction diffuser located in said heat storage layer for extracting heated brine therefrom, said extraction diffuser comprising:

(1) top and bottom circular plates having peripheral edges, one of said plates having a circular opening for connection to a conduit by which heated brine is removed from the heat storage layer, said plates having opposite, facing surfaces of revolution with a common axis established by said circular opening for defining first and second fluid flow paths, one end of the first flow path being defined by said circular opening, the other end of the first flow path being connected to one end of the second flow path whose other end is defined by the peripheral edges of said plates, said flow paths being oriented such that fluid traversing said flow paths is turned through 90°;

(2) said opposite, facing surfaces being constructed and arranged so that the cross-section of the second fluid flow path decreases continuously, throughout its length, in the direction of fluid flow towards said axis.

16. Apparatus according to claim 15 including a discharge diffuser located in said heat storage layer below said extraction diffuser for discharging heat-depleted brine to said heat storage layer, said discharge diffuser comprising:

(a) top and bottom circular plates having peripheral edges, one of said plates having a circular opening for connection to a conduit by which heat-depleted brine is returned to the heat storage layer, said plates having opposite, facing surfaces of revolution with a common axis established by said circular opening for defining first and second fluid flow paths, one end of the first flow path being defined by said circular opening, the other end of the first flow path being connected to one end of the second flow path whose other end is defined by the peripheral edges of said plates, said flow paths being oriented such that fluid traversing said flow paths is turned through 90°;

(2) said opposite, facing surfaces being constructed and arranged so that the cross-section of the second fluid flow path decreases continuously, throughout its length, in the direction of fluid flow away from said axis.

* * * * *